United States Patent
Nishinouchi

(10) Patent No.: US 10,473,884 B2
(45) Date of Patent: Nov. 12, 2019

(54) DRIVE CIRCUIT OF VOICE COIL MOTOR, METHOD FOR DRIVING VOICE COIL MOTOR, LENS MODULE AND ELECTRONIC APPARATUS USING THE SAME

(71) Applicant: Rohm Co., Ltd., Kyoto (JP)

(72) Inventor: Masato Nishinouchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 66 days.

(21) Appl. No.: 15/456,731

(22) Filed: Mar. 13, 2017

(65) Prior Publication Data

US 2017/0276900 A1 Sep. 28, 2017

(30) Foreign Application Priority Data

Mar. 25, 2016 (JP) ................................. 2016-061845

(51) Int. Cl.
*G02B 7/09* (2006.01)
*H02P 7/025* (2016.01)
*H02P 25/034* (2016.01)

(52) U.S. Cl.
CPC ............... *G02B 7/09* (2013.01); *H02P 7/025* (2016.02); *H02P 25/034* (2016.02)

(58) Field of Classification Search
CPC .................................. G02B 7/09; H02P 7/025
See application file for complete search history.

(56) References Cited

FOREIGN PATENT DOCUMENTS

JP 2014-131416 7/2014

*Primary Examiner* — Jack Dinh
(74) *Attorney, Agent, or Firm* — Fish & Richardson P.C.

(57) ABSTRACT

A drive circuit, which is mounted on an electronic apparatus having a voice coil motor and drives the voice coil motor, includes: an interface circuit configured to receive a first signal indicating a target position of the voice coil motor and a second signal related to a posture of the electronic apparatus; a control circuit configured to generate a current command value of a drive current in response to the first signal and the second signal; and a current driver configured to generate the drive current in response to the current command value and supply the drive current to the voice coil motor.

13 Claims, 9 Drawing Sheets

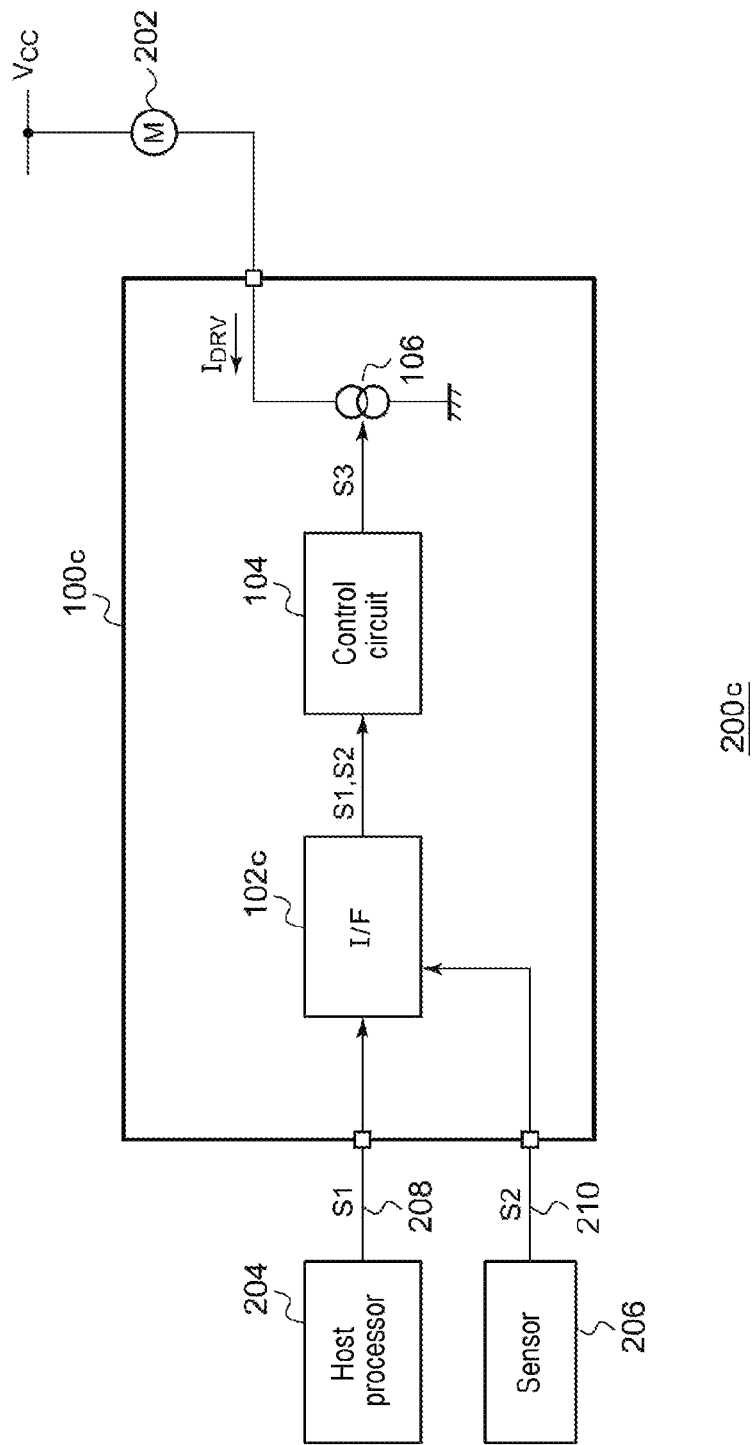

DRIVE CIRCUIT OF VOICE COIL MOTOR, METHOD FOR DRIVING VOICE COIL MOTOR, LENS MODULE AND ELECTRONIC APPARATUS USING THE SAME

CROSS-REFERENCE TO RELATED APPLICATION(S)

This application is based upon and claims the benefit of priority from Japanese Patent Application No. 2016-061845, filed on Mar. 25, 2016, the entire contents of which are incorporated herein by reference.

TECHNICAL FIELD

The present disclosure relates to a technique for controlling a voice coil motor.

BACKGROUND

In digital still cameras, digital video cameras, or electronic apparatuses with an imaging function (for example, smart phones and tablet terminals), an actuator for positioning a focusing lens is provided. Such an actuator adopts a stepping motor system, a piezo system, a voice coil motor (VCM) system or the like.

A VCM can generate a driving force according to the direction of a current flowing through a coil. A spring return system and a bidirectional drive system are known as VCM drive systems. A VCM with a spring return mechanism is structured to generate a driving force in a first direction by supplying a drive current to a coil and generate a driving force in a second direction, which is opposite to the first direction, by a force of a spring attached to a mover of the VCM. That is, electrical driving and mechanical driving are used in combination. When driving the VCM with the spring return mechanism, the drive current is supplied to the coil only in one direction, thereby simplifying a drive circuit. On the other hand, a drive circuit capable of sourcing and sinking a drive current from both ends of the VCM, like an H bridge circuit, is used in the bidirectional drive system. In the bidirectional drive system, a driving force in positive and negative directions can be obtained by switching the direction of a coil current.

The present inventor has studied a voice coil motor installed in an electronic apparatus and has found the following problems. FIGS. 1A to 1D are views showing a usage form of an electronic apparatus. The electronic apparatus 500 is, for example, a smart phone and has a camera (lens) 530 provided on a surface S1 opposite to a display in a housing. In FIG. 1A, the surface S1 is a vertical surface. In FIG. 1C, the surface S1 is a horizontal surface. FIGS. 1C and 1D show a state of a focusing lens 520. The focusing lens 520 is mechanically connected to a return spring 522. A voice coil motor (not shown) drives the focusing lens 520 along an arrow (stroke direction) 524.

As illustrated in FIG. 1C, in the state of FIG. 1A, gravity acts on the lens 520 in the direction perpendicular (indicated by an arrow g) to the stroke direction 524. Therefore, the influence of gravity on the driving of the voice coil motor may be neglected. On the other hand, as illustrated in FIG. 1D, in the state of FIG. 1B, gravity acts on the lens 520 in the same direction (indicated by an arrow g) as the stroke direction 524. That is, the gravity acts in a direction to displace the lens 520.

FIG. 2 is a block diagram illustrating a focusing system of the electronic apparatus 500. The system includes a lens module 502, an imaging element 504, an image processor 506, and a CPU (Central Processing Unit) 508.

The lens module 502 is provided to realize an autofocus function and includes a focusing lens 512 and an actuator 510. The lens 512 is movably supported in an optical axis direction. The actuator 510 controls the position of the lens 512 based on a command value S1 from the CPU 508.

Light (an image) which passed through the lens 512 is incident onto the imaging element 504. The image processor 506 reads image data from the imaging element 504. Based on the image data read by the image processor 506, the CPU 508 determines a target position of the focusing lens 512 so that the image passed through the focusing lens 512 is formed on the imaging element 504, and outputs the command value S1 corresponding to the target position to the actuator 510. The autofocus system may be a contrast system or a phase difference detection system.

In the system of FIG. 2, regardless of the posture of the electronic apparatus 500, in other words, without being affected by gravity, the same processing is performed. For example, in the contrast system, the command value S1 indicating the position of the lens 512 is feedback-controlled so that the contrast of the image captured via the focusing lens 512, which is affected or unaffected by gravity, is increased. A drive circuit (not shown) of the actuator 510 also supplies a drive current corresponding to the command value S1 to a VCM, regardless of the posture of the electronic apparatus 500.

Such control has a problem that, depending on the posture of the electronic apparatus 500, it takes a long time until the focusing lens 512 is stabilized at the optimum position by feedback. This means that a position command signal is repeatedly transmitted from the CPU 508 to the drive circuit of the actuator 510, which causes another problem of increased power consumption. Although the spring return system has been described here, the same problem may occur also in the bidirectional driving system. In addition to the autofocus, similar problems may arise in various actuators that are affected by the posture of the electronic apparatus.

SUMMARY

The present disclosure provides some embodiments of a VCM drive circuit which is capable of converging a voice coil motor to a target position in a short time irrespective of the posture of an electronic apparatus.

According to one embodiment of the present disclosure, there is provided a drive circuit which is mounted on an electronic apparatus having a voice coil motor and drives the voice coil motor. The drive circuit includes: an interface circuit configured to receive a first signal indicating a target position of the voice coil motor and a second signal related to a posture of the electronic apparatus; a control circuit configured to generate a current command value of a drive current in response to the first signal and the second signal; and a current driver configured to generate the drive current in response to the current command value and supply the drive current to the voice coil motor.

According to this embodiment, by generating the current command value in consideration of the influence of gravity based on the second signal related to the posture of the electronic apparatus, the voice coil motor as seen from a host processor behaves as if gravity does not affect the voice coil motor. As a result, a feedback control time in the host processor can be shortened.

The control circuit may offset a relationship between the first signal and the current command value in response to the second signal. The present inventor has studied and found that, due to the influence of gravity, a relationship between the current command value and the displacement amount (stroke amount) of the voice coil motor is shifted while maintaining linearity. Therefore, by correcting the relationship between the first signal and the current command value in response to the second signal, the relationship between the first signal and the displacement amount can be maintained regardless of the posture of the electronic apparatus.

An object to be position-controlled by the voice coil motor may be connected to a return spring. An offset amount of the relationship between the first signal and the current command value may be defined by $Gx/(2\pi f_0)^2$, where $f_0$ denotes a resonance frequency of a system including the object and the return spring and Gx denotes a stroke direction component of the gravity applied to the object.

According to another embodiment of the present disclosure, there is provided a drive circuit which drives a voice coil motor. The drive circuit includes: an interface circuit configured to receive a first signal indicating a target position of the voice coil motor and a second signal related to a posture of an electronic apparatus; and a current driver configured to generate a drive current including a component proportional to the first signal and an offset component according to the second signal.

According to this embodiment, by offsetting the drive current based on the second signal related to the posture of the electronic apparatus, the voice coil motor as seen from a host processor behaves as if the gravity does not affect the voice coil motor. As a result, a feedback control time in the host processor can be shortened.

An object to be position-controlled by the voice coil motor may be connected to a return spring. The offset component may be defined by $Gx/(2\pi f_0)^2$, where $f_0$ denotes the resonance frequency of a system including the object and the return spring and Gx denotes a stroke direction component of gravity applied to the object.

The electronic apparatus may include an acceleration sensor. The second signal may include an output of the acceleration sensor. The acceleration sensor may be a tri-axial acceleration sensor.

The interface circuit may receive the first signal and the second signal via a common data bus. The data bus may be an I²C (Inter Integrated Circuit) bus.

The drive circuit may be integrated on a single semiconductor substrate.

As used herein, the term "integrated" is intended to include both of a case where all elements of a circuit are formed on a semiconductor substrate and a case where main elements of the circuit are integrated on the semiconductor substrate. Some resistors, capacitors and the like for adjustment of a circuit constant may be provided outside the semiconductor substrate.

According to another embodiment of the present disclosure, there is provided a lens module including: a focusing lens; a voice coil motor including a mover connected to the focusing lens; and the above-described drive circuit configured to drive the voice coil motor.

According to another embodiment of the present disclosure, there is provided a lens module including: a lens for camera shake compensation; a voice coil motor including a mover connected to the lens for camera shake compensation; and the above-described drive circuit configured to drive the voice coil motor.

According to another embodiment of the present disclosure, there is provided an electronic apparatus including: the above-described lens module; and an imaging element configured to take an image of light which passed through the lens module.

BRIEF DESCRIPTION OF THE DRAWINGS

FIG. 9 is a circuit diagram of a drive circuit according to a sixth modification.

DETAILED DESCRIPTION

Figure 1A:
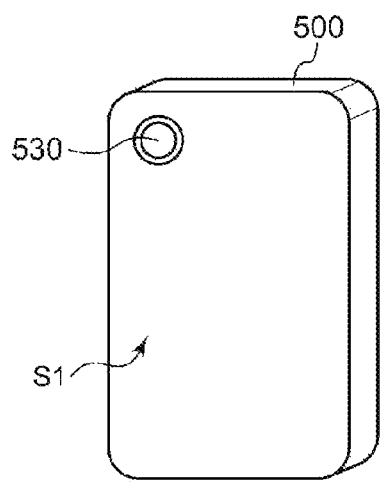
FIGS. 1A to 1D are views showing a usage form of an electronic apparatus.
Figure 1C:
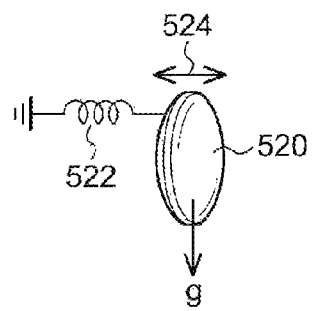

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 3:
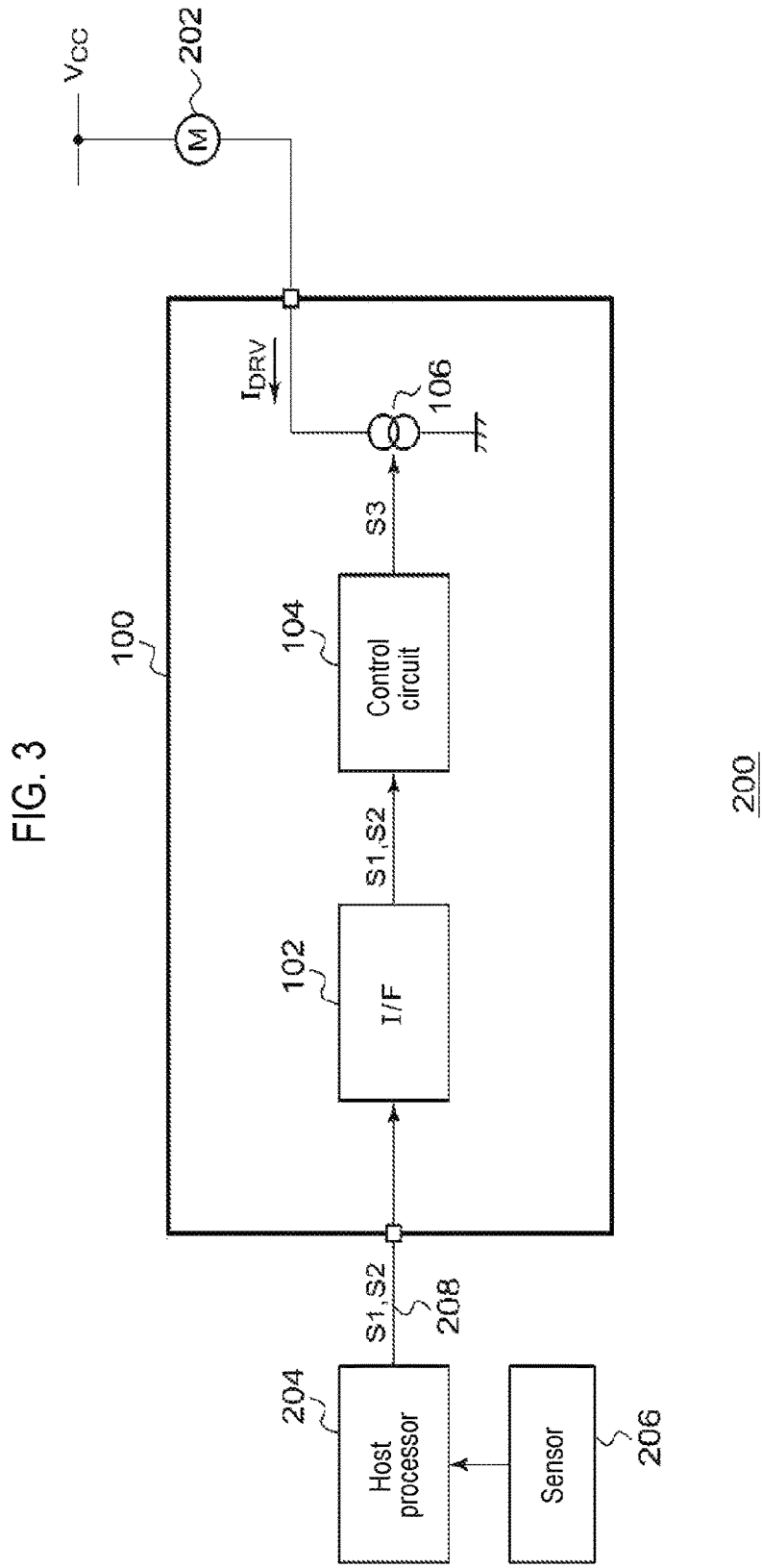
FIG. 3 is a block diagram of an actuator system including a drive circuit according to an embodiment.

FIG. 3 is a block diagram of an actuator system 200 including a drive circuit 100 according to an embodiment. The actuator system 200 includes a voice coil motor (VCM) 202, a host processor 204, a sensor 206, and a drive circuit 100 for the VCM 202, and is mounted in an electronic apparatus. The electronic apparatus is a device having a posture varied in use, and typically may be a portable device such as a smart phone, a tablet terminal, a digital camera, a portable audio player or the like.

Figure 2:
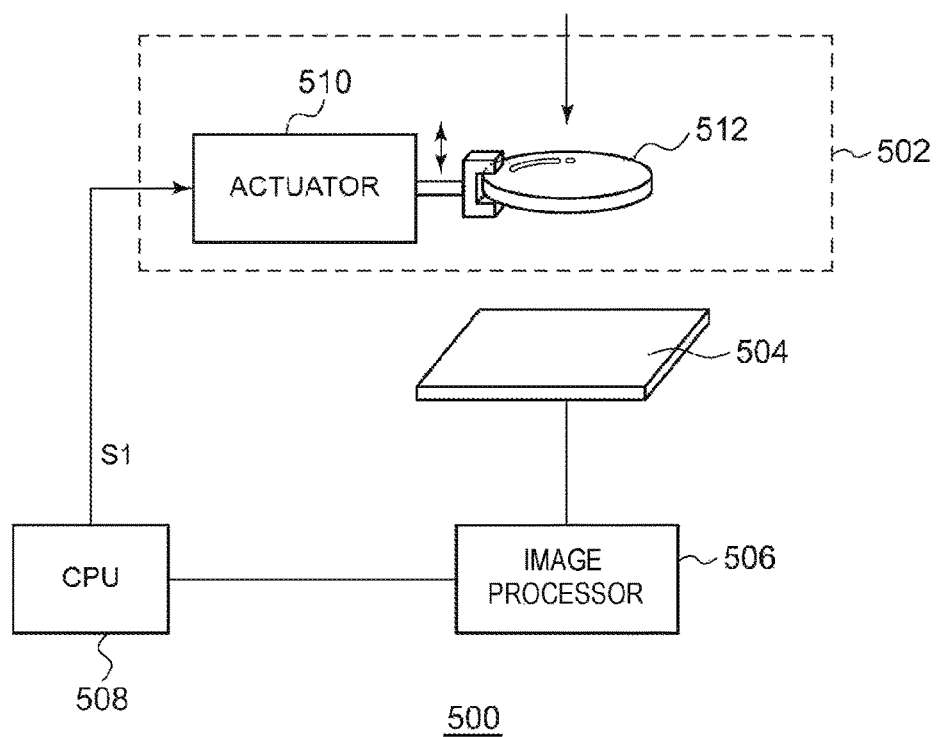
FIG. 2 is a block diagram illustrating a focusing system of the electronic apparatus.

A mover of the VCM 202 is mechanically connected to an object to be position-controlled. In this embodiment, for the purpose of easy understanding and simplified explanation, the actuator system 200 for positioning an autofocus lens (focusing lens) as shown in FIG. 2 will be described. In this case, the object is a focusing lens.

The host processor 204 generates a first signal S1 indicating a target value position of the object, in other words, the mover of the voice coil motor. The sensor 206 acquires information on the posture of the electronic apparatus 500. For example, the sensor 206 may be a triaxial acceleration sensor. The host processor 204 generates a second signal S2 based on information on triaxial acceleration detected by the sensor 206 or information obtained therefrom. The host processor 204 transmits the first signal S1 and the second signal S2 to the drive circuit 100 via a bus 208, For example, the bus 208 may be a serial bus such as an I²C bus.

The drive circuit 100 is a functional IC that includes an interface circuit 102, a control circuit 104, and a current driver 106 and is integrated on a single semiconductor substrate. The drive circuit 100 does not have a position detection means of the mover of the VCM 202, but supplies a drive current $I_{DRV}$ to the VCM 202 based on a command value from the host processor 204 and controls the position of the mover in an open loop manner (feedforward control). The interface circuit 102 receives the first signal S1 and the second signal S2. The frequency of transmission of the first signal S1 may be different from that of the second signal S2. The first signal S1 is transmitted at a high frequency for high-speed feedback control, while the second signal S2 may be transmitted at a frequency lower than that of the first signal S1 because the second signal S2 may be transmitted at a frequency that can follow the speed of change in posture of the electronic apparatus.

Based on the first signal S1 and the second signal S2 received by the interface circuit 102, the control circuit 104 generates a current command value S3 of the drive current $I_{DRV}$. That is, the control circuit 104 reflects the posture of the electronic apparatus indicated by the second signal S2 in the current command value S3. For example, according to the second signal S2, that is, the posture of the electronic apparatus, the control circuit 104 offsets a relationship between the first signal S1 and the current command value S3.

The current driver 106 generates the drive current $I_{DRV}$ corresponding to the current command value S3 and supplies the drive current $I_{DRV}$ to the VCM 202. The drive current $I_{DRV}$ may be proportional to the current command value S3. The current driver 106 is not particularly limited in its configuration but may be configured with, for example, a combination of a D/A converter which converts the current command value S3 into an analog voltage and a current source (V/I conversion circuit) which generates a drive current corresponding to the analog voltage. Alternatively, the current driver 106 may be configured with a current DAC (D/A converter). Although the current driver 106 shown in FIG. 3 is a current sink type driver, the current driver 106 may be a current source type driver.

The configuration of the drive circuit 100 is as described above. Next, the operation of the drive circuit 100 will be explained.

Figure 4A:
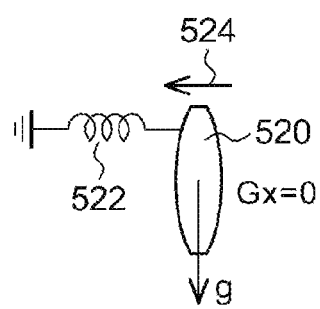
FIGS. 4A to 4E are views illustrating forces applied to a focusing lens.
Figure 4B:
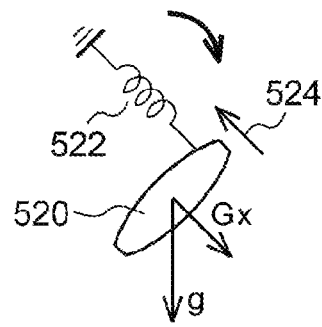
Figure 4C:
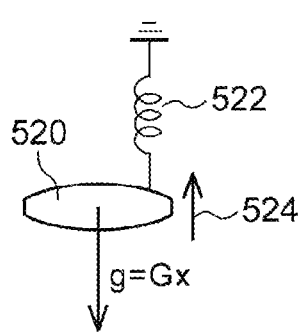

FIGS. 4A to 4E are views illustrating forces applied to the focusing lens 520. FIG. 4A shows a reference state in which gravity g does not act on a stroke direction 524 of the mover of the VCM. When the electronic apparatus is inclined from the reference state, a gravity component Gx in the direction opposite to the stroke direction 524 increases as shown in FIGS. 4B and 4C. This means that, when the same drive current $I_{DRV}$ flows through the VCM, the amount of displacement becomes smaller than that in the reference state.

Figure 4D:
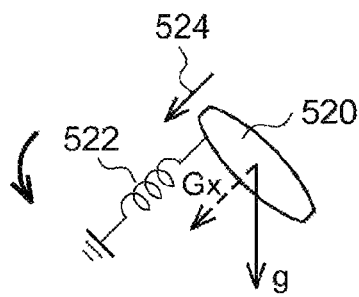
Figure 4E:
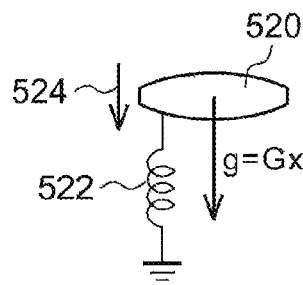

As shown in FIGS. 4D and 4E, when the electronic apparatus is inclined to the opposite side from the reference state, the gravity component Gx in the stroke direction 524 increases. This means that, when the same drive current $I_{DRV}$ flows through the VCM, the amount of displacement becomes larger than that in the reference state.

Figure 5A:
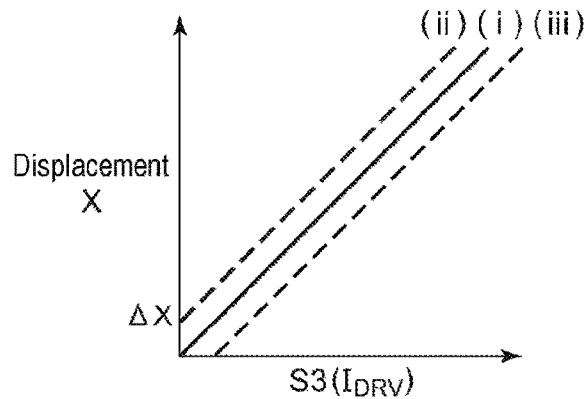
FIGS. 5A to 5C are graphical views for explaining the operation of the drive circuit.
Figure 5B:
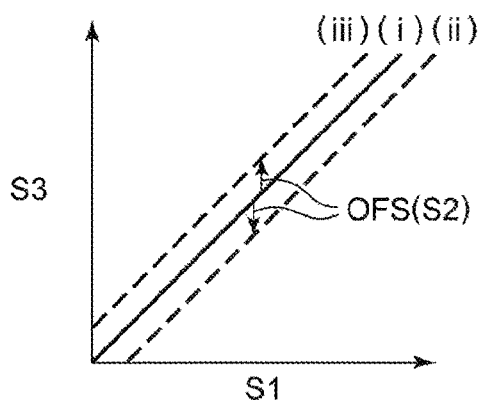
Figure 5C:
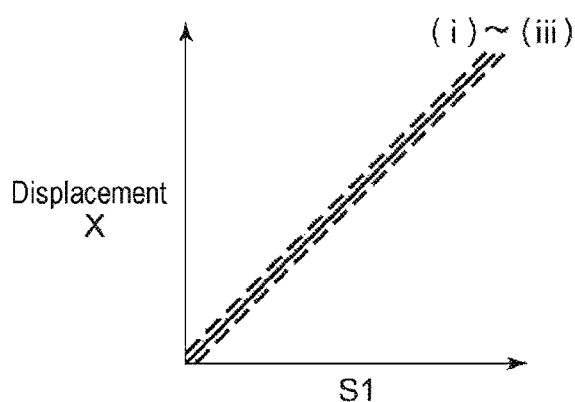

FIGS. 5A to 5C are graphical views for explaining the operation of the drive circuit 100. In the reference state where the influence of gravity can be ignored as shown in FIG. 1A or FIG. 4A, the displacement amount (position) of the mover of the VCM 202 is linearly changed with respect to the drive current $I_{DRV}$ (that is, the current command value S3) as shown in (i) of FIG. 5A, and the mover is positioned at a reference position (for example, zero) in a state where the drive current $I_{DRV}$ is zero.

Figure 1B:
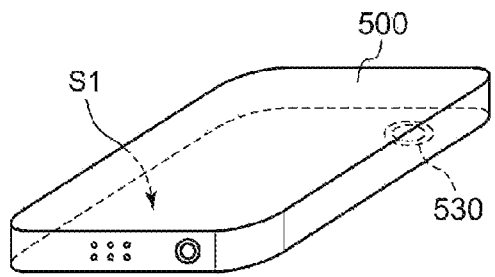
Figure 1D:
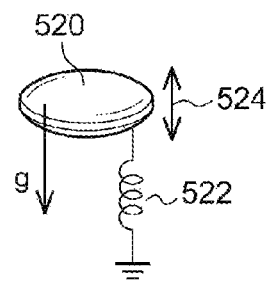

When the posture of the electronic apparatus 500 is changed, depending on the direction and magnitude of gravity applied to the object (that is, the focusing lens 520) as shown in FIGS. 4A to 4E, the relationship between the driving current $I_{DRV}$ and the displacement amount is shifted. For example, when the lens is in a downward posture and gravity is applied in the stroke direction of the mover as shown in FIG. 1B, the amount of displacement increases as shown in (ii) of FIG. 5A. Conversely to FIG. 1B, when the camera 530 is in an upward posture and gravity is applied in the counter-stroke direction of the mover (the direction of a return spring force), the amount of displacement decreases as shown in (iii) of FIG. 5A. The displacement amount X is expressed by the following equation (1).

$$X = \alpha \times S3 + \Delta X \tag{1}$$

Where, ΔX is a displacement amount (initial displacement amount) at the drive current $I_{DRV}$ of zero and is represented by a function f( ) of the posture of the electronic apparatus (i.e., the second signal S2).

$$\Delta X = f \tag{S2}$$

FIG. 5B shows the relationship between the first signal S1 and the current command value S3. In a state in which the influence of gravity can be ignored (for example, the state shown in FIG. 1A), the current command value S3 is proportional to the first signal S1. On the other hand, in states (ii) and (iii) of FIG. 5B in which the influence of gravity cannot be ignored, the control circuit 104 offsets the current command value S3 from the proportional relationship of (i) of FIG. 5B. The current command value S3 is expressed by the following equation (2).

$$S3 = \beta \times S1 + OFS \tag{2}$$

The orientation and amount of the offset OFS depends on the degree of influence of gravity, in other words, the second signal S2, and is expressed by the function g( ) of S2.

$$OFS = g(S2)$$

Substituting S3 in Eq. (2) into Eq. (1) yields the following Eq. (3), $$X = \alpha \times (\beta \times S1 + OFS) + \Delta X \tag{3}$$

Therefore, when the following Eq. (4) is satisfied, $$\alpha \times OFS = -\Delta X \tag{4}$$

the displacement amount X that does not depend on the posture of the electronic apparatus can be obtained. That is, the function g(S2) of the offset amount may be expressed by the following Eq. (5).

$$OFS=g(S2)=-\Delta X/\alpha=-f(S2)/\alpha \tag{5}$$

The driving current $I_{DRV}$ generated by the current driver 106 has a component proportional to the first signal S1 and an offset component corresponding to the second signal S2. FIG. 5C shows the relationship between the first signal S1 and the displacement amount of the mover. By correcting the relationship between the current command value S3 and the first signal S1 based on the second signal S2, the relationship between the first signal S1 and the displacement amount becomes constant regardless of the influence of gravity.

In this way, according to the drive circuit 100 of the embodiment, by generating the current command value S3 in consideration of the influence of gravity on the basis of the second signal S2 related to the posture, the VCM 202 seen from the host processor 204 behaves as if gravity does not affect the VCM 202. Thus, the calculation processing time taken for positioning in the host processor 204, that is, the time of feedback control, can be shortened and the mover can be converged to the target position in a short time. As a result, the camera can reach a shooting-ready state in a short time so that opportune shots can be taken easily.

While the feedback control is performed, the updated first signal S1 continues to be transmitted from the host processor 204 to the drive circuit 100. Shortening the time for feedback control means a decrease in the number of times of data transmission and a reduction in power consumption required for data transmission. In many battery-driven electronic apparatuses, the reduction in power consumption brings about a merit of lengthening the battery duration.

The present disclosure extends to various devices and circuits which are grasped as the block diagram or the circuit diagram of FIG. 2 or are derived from the above description, and is not limited to specific configurations. Hereinafter, in order not to narrow the scope of the present disclosure but to help understanding of the essence and circuit operation of the present disclosure and to clarify them, more concrete examples of control or configuration examples will be described.

For example, when one axis (for example, x-axis) three axes (x-axis, y-axis, and z-axis) of the triaxial acceleration sensor coincides with the stroke direction, the acceleration data on the x-axis represents the gravity component in the stroke direction, in this case, the x-axis acceleration data Gx may be transmitted as the second signal S2.

Alternatively, the second signal S2 may include a plurality of acceleration data among the three axes of the triaxial acceleration sensor. The control circuit 104 may calculate the gravity component Gx in the stroke direction of the VCM by calculating the acceleration data of the plurality of axes and may correct the current command value S3 according to the gravity component Gx in the stroke direction.

The relationship between the offset amount OFS and the second signal S2 may be defined based on actual measurements. For example, while varying a tilt angle of the electronic apparatus, the relationship between the second signal S2 and the displacement amount when the drive current $I_{DRV}$=0 (i.e., the Y-intercept in FIG. 5A), that is, the function $\Delta X=f(S2)$, is measured. Then, the offset amount OFS is determined based on the obtained functions f(S2) and Eq. (5).

The relationship between the offset amount OFS and the second signal S2 may be built in the drive circuit 100 in a table format or stored in an external nonvolatile memory. Alternatively, the arithmetic expression of Eq. (5) may be defined in an arithmetic unit inside the control circuit 104 and the offset amount OFS may be calculated by arithmetic processing.

The relationship between the offset amount OFS and the second signal S2 may be defined based on theoretical calculation. In a focusing module of a spring return mechanism, the initial displacement amount $\Delta X$ is expressed by Eq. (6).

$$\Delta X=Gx/(2\pi f_0)^2 \tag{6}$$

Where, Gx is a component (acceleration) in the stroke direction of the gravity applied to the focusing lens 520 and $f_0$ is the resonance frequency of the system including the focusing lens 520 and a return spring 522. Therefore, the control circuit 104 may calculate the acceleration component Gx by gravity based on the second signal S2 and calculate the offset amount OFS based on Eqs. (6) and (5).

Figure 6:
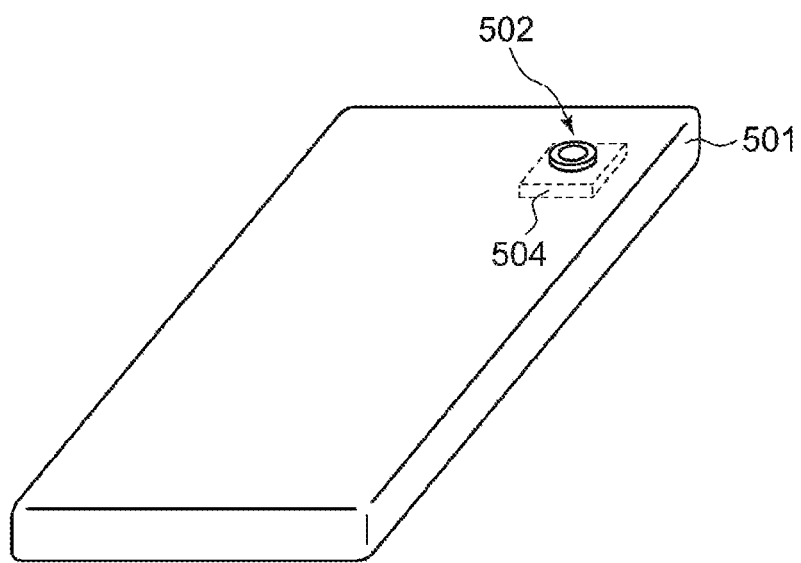
FIG. 6 is a perspective view illustrating a mobile phone terminal which is one example of an electronic apparatus.

Next, a specific example of the electronic apparatus 500 will be described. FIG. 6 is a perspective view illustrating a mobile phone terminal which is one example of the electronic apparatus 500. The electronic apparatus 500 includes a housing 501, a lens module 502 and an imaging element 504. The imaging element 504 is incorporated in the housing 501. In the housing 501, an opening is formed in a portion overlapping with the imaging element 504 and the lens module 502 is installed in the opening.

Hereinabove, the embodiment of the present disclosure has been described. However, the embodiment has been presented by way of example only. It should be understood by those skilled in the art that various modifications to combinations of elements or processes may be made and such modifications also fall within the scope of the present disclosure. Modifications will be described below.

(First Modification)

Figure 7:
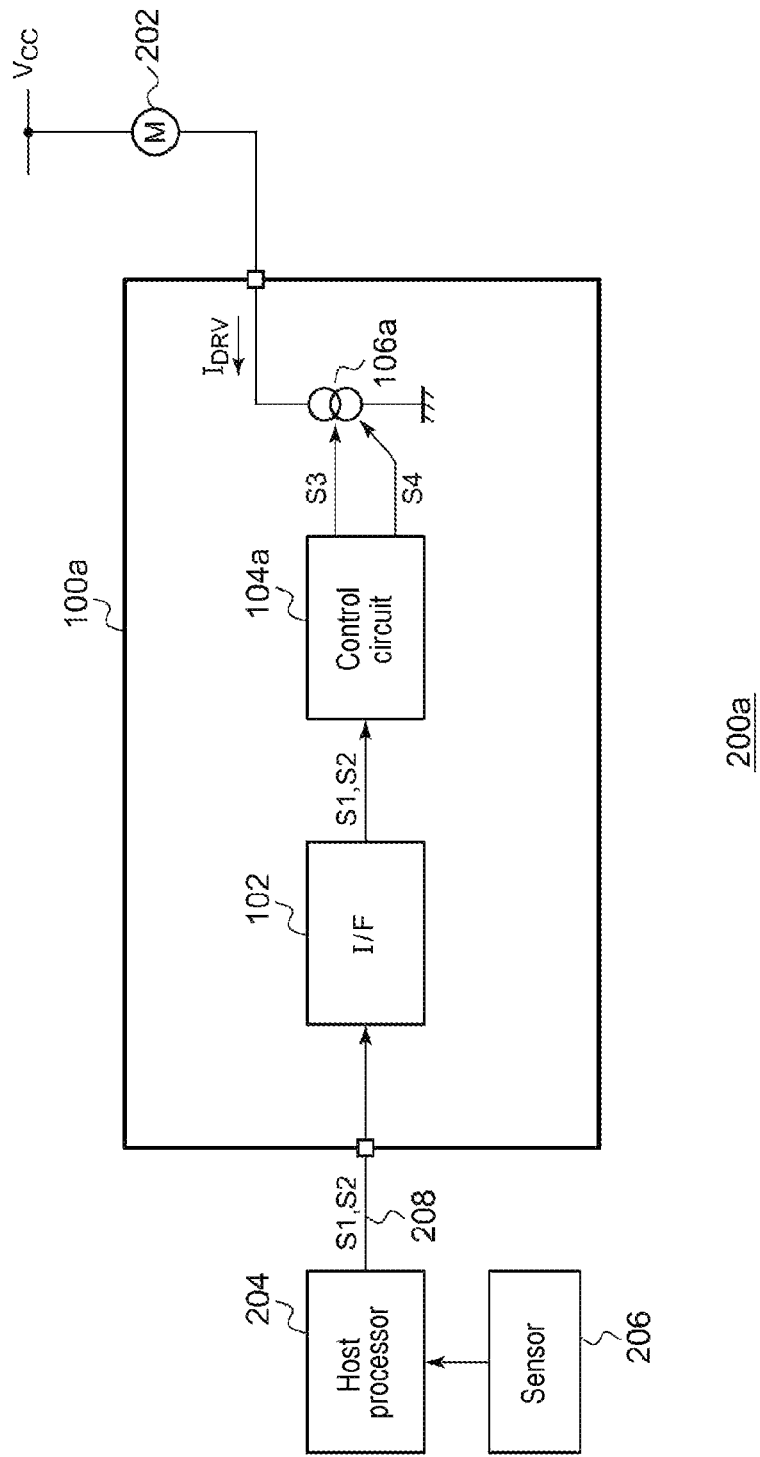
FIG. 7 is a block diagram of an actuator system including a drive circuit according to a first modification.

FIG. 7 is a block diagram of an actuator system 200a including a drive circuit 100a according to a first modification. The driving circuit 100a includes an interface circuit 102, a control circuit 104a and a current driver 106a. The current driver 106a receives two control inputs, that is, a current command value S3 and an offset command value S4. The current driver 106a generates a drive current $I_{DRV}$, which includes a component substantially proportional to the current command value S3 and an offset component proportional to the offset command value S4.

The control circuit 104a generates the current command value S3 and the offset command value S4 based on the first signal S1 and the second signal S2. The current command value S3 may be the first signal S1 itself or may be a value proportional thereto. The offset command value S4 has a value corresponding to the second signal S2, that is, the posture of the electronic apparatus.

According to the first modification, by offsetting the drive current based on the second signal S2 related to the posture, the VCM 202 seen from the host processor 204 behaves as if gravity does not affect the VCM 202. As a result, the feedback control time in the host processor 204 can be shortened and the same effect as in the embodiment can be obtained.

(Second Modification)

Figure 8:
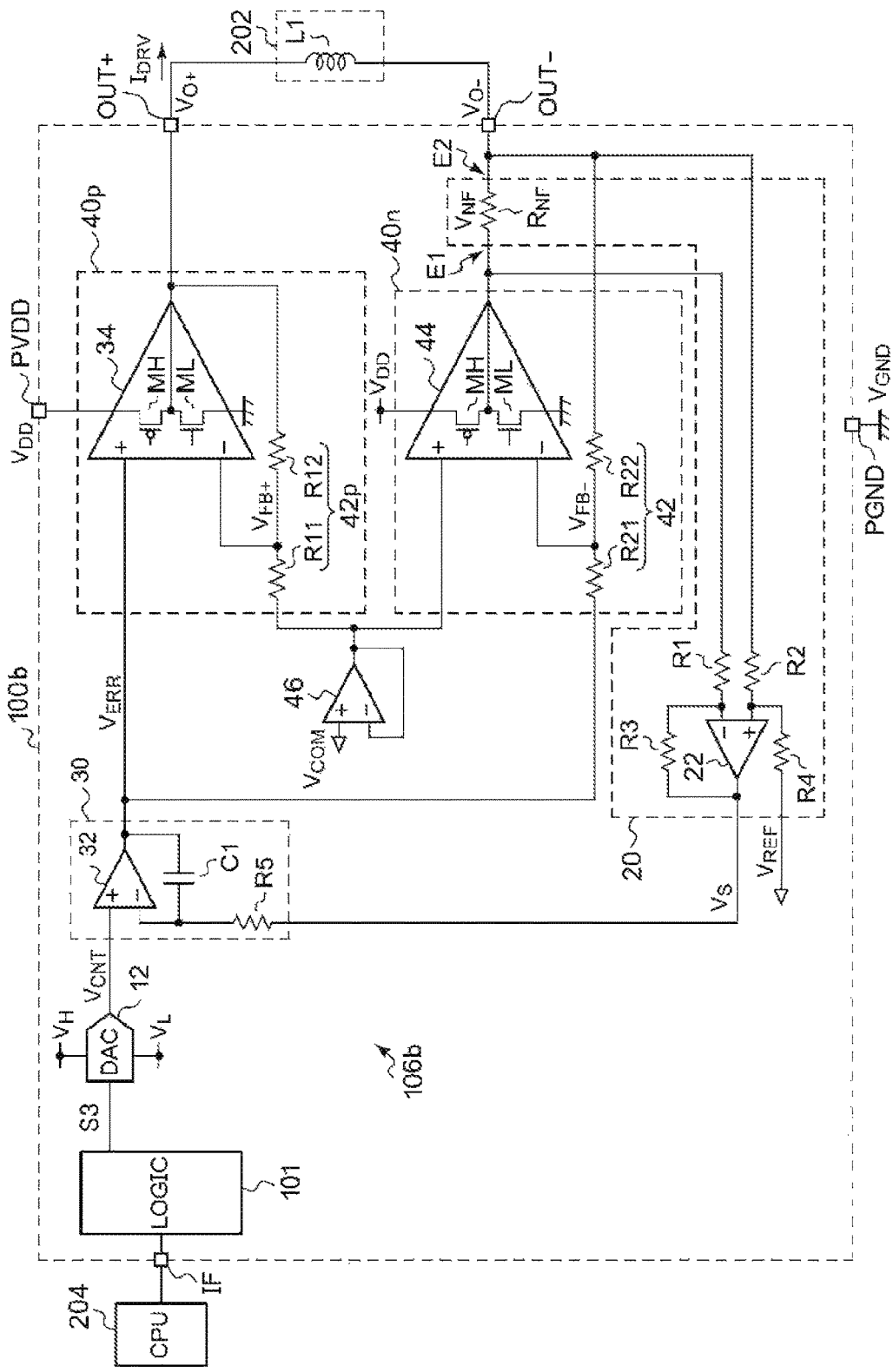
FIG. 8 is a circuit diagram of a drive circuit according to a second modification.

Although the drive circuit of the spring return type VCM 202 has been described in the embodiment, the present disclosure is also applicable to a bidirectional drive system. FIG. 8 is a circuit diagram of a drive circuit 100b according to a second modification. The drive circuit 100 described above generates the unidirectional drive current $I_{DRV}$, whereas the drive circuit 100a of FIG. 8 is capable of generating a bidirectional drive current $I_{DRV}$. Therefore, the drive circuit 100a can drive a VCM 202 having no spring return mechanism.

A logic circuit 101 includes the interface circuit 102 and the control circuit 104 of FIG. 3. A current driver 106b includes a D/A converter 12, a current detection circuit 20, an error amplifier 30, a first driver 40p and a second driver 40n. The D/A converter 12 converts the current command value S3 into an analog control voltage $V_{CNT}$.

The current detection circuit 20 detects a drive current $I_{DRV}$ flowing through a coil L1 of the VCM 202 and generates a detection voltage Vs corresponding to the drive current $I_{DRV}$. The detection voltage Vs is given by the following equation (7) using a gain k and a reference voltage $V_{REF}$.

$$Vs = V_{REF} + k \times I_{DRV} \qquad (7)$$

For example, the current detection circuit 20 includes a first operational amplifier 22, a detection resistor $R_{NF}$, a first resistor R1, a second resistor R2, a third resistor R3, and a fourth resistor R4. The detection resistor $R_{NF}$ is placed in a path of the drive current $I_{DRV}$. For example, the detection resistor $R_{NF}$ is interposed between a second terminal of the coil L1 and an output terminal of the second driver 40n. Alternatively, the detection resistor $R_{NF}$ may be interposed between a first terminal of the coil L1 and an output terminal of the first driver 40p. A voltage drop $V_{NF}$ proportional to the drive current bay is generated in the detection resistor $R_{FN}$.

The first resistor R1 is interposed between a first input terminal (inverting input terminal) of the first operational amplifier 22 and a first terminal E1 of the detection resistor $R_{NF}$. The second resistor R2 is interposed between a second input terminal (non-inverting input terminal) of the first operational amplifier 22 and a second terminal E2 of the detection resistor $R_{NF}$. The third resistor R3 is interposed between an output terminal of the first operational amplifier 22 and the first input terminal (inverting input terminal) thereof. The fourth resistor R4 has one end connected to the second input terminal (non-inverting input terminal) of the first operational amplifier 22 and the other end to which the reference voltage $V_{REF}$ is applied.

Given that the potentials of the first terminal E1 and the second terminal E2 of the detection resistor $R_{NF}$ are V1 and V2, respectively, and R1=R2=Ra and R3=R4=Rb, the detection voltage Vs is given by Eq. (8).

$$Vs = V_{REF} + Rb/Ra \times (V2 - V1) \qquad (8)$$

Substituting Eq. (9) into Eq. (8) yields Eq. (10).

$$V_{NF} = V2 - V1 = R_{NF} \times I_{DRV} \qquad (9)$$

$$Vs = V_{REF} + Rb/Ra \times R_{NF} \times I_{DRV} \qquad (10)$$

Therefore, the gain k of the current detection circuit 20 is Rb/Ra×RNF. It should be noted that the configuration of the current detection circuit 20 is not limited to that shown in FIG. 8 but may adopt other configurations.

The error amplifier 30 generates an error voltage $V_{ERR}$ by amplifying an error between the control voltage $V_{CNT}$ indicating the displacement amount of the voice coil motor and the detection voltage Vs. For example, the error amplifier 30 may be an integrator amplifier.

For example, the error amplifier 30 includes a second operational amplifier 32, a first capacitor C1, and a fifth resistor R5. The control voltage $V_{CNT}$ is input to a first input terminal (non-inverting input terminal) of the second operational amplifier 32. The first capacitor C 1 is interposed between a second input terminal (inverting input terminal) of the second operational amplifier 32 and the output terminal thereof. A first terminal of the fifth resistor R5 is connected to the second input terminal (inverting input terminal) of the second operational amplifier 32 and the detection voltage Vs is applied to a second terminal of the fifth resistor R5. The configuration of the error amplifier 30 is not limited to that shown in FIG. 8.

The first driver 40p is connected to the first terminal of the coil L1 of the VCM 202 and sources or sinks the drive current $I_{DRV}$ in response to the error voltage $V_{ERR}$. The second driver 40n operates in a phase opposite to that of the first driver 40p and is connected to the second terminal of the coil L1 of the VCM 202 to sink or source the drive current $I_{DRV}$ in response to the error voltage $V_{ERR}$.

A buffer 46 outputs a predetermined common voltage $V_{COM}$. The first driver 40p includes a non-inverting amplifier that amplifies the error voltage $V_{ERR}$ in a non-inverting manner using the common voltage $V_{COM}$ as a reference and applies a first drive voltage $V_{O+}$ to the first terminal of the coil L1. The second driver 40n includes an inverting amplifier that amplifies the error voltage $V_{ERR}$ in an inverting manner using the common voltage $V_{COM}$ as a reference and applies a second drive voltage $V_{O-}$ having a phase opposite to that of the first drive voltage $V_{O+}$ to the second terminal of the coil L1.

More specifically, the first driver 40p includes a first voltage dividing circuit 42p and a first amplifier 34. The first voltage dividing circuit 42p includes resistors R11 and R12 and divides the first output (drive) voltage $V_{O+}$ generated at the first terminal of the coil L1 and the predetermined common voltage $V_{COM}$ at a predetermined division ratio. The first amplifier 34 has a push-pull output stage constituted by a high-side transistor MH and a low-side transistor ML. The first amplifier 34 controls the high-side transistor MH and the low-side transistor ML of the push-pull output stage so that a voltage $V_{FB+}$ divided by the first voltage dividing circuit 42p is set to be equal to the error voltage $V_{ERR}$.

The second driver 40n includes a second voltage dividing circuit 42 and a second amplifier 44. The second amplifier 44 includes resistors R21 and R22 and divides the second output (drive) voltage $V_{O-}$ generated at the second terminal of the coil L1 and the error voltage $V_{ERR}$ at a predetermined division ratio. The second amplifier 44 has a push-pull output stage constituted by a high-side transistor MH and a low-side transistor ML. The second amplifier 44 controls the high-side transistor MH and the low-side transistor ML of the push-pull output stage so that a voltage $V_{FB-}$ divided by the second voltage dividing circuit 42 is set to be equal to the common voltage $V_{COM}$.

The drive circuit 100a generates the drive voltages $V_{O+}$ and $V_{O-}$ so that the detection voltage Vs is set to be equal to the control voltage $V_{CNT}$ by a feedback loop including the error amplifier 30.

As described above, since the detection voltage Vs is given by Eq. (8), the drive current $I_{DRV}$ is feedback-controlled so as to approach a target value given by the following equation (11).

$$I_{DRV} = (V_{CNT} - V_{REF})/k \qquad (11)$$

The control voltage $V_{CNT}$ ranges from 0 to $V_H$, the maximum value $I_{MAX}$ of the drive current $I_{DRV}$ is $I_{DRV} = (V_H - V_{REF})/k$, and the minimum value $I_{MIN}$ of the drive current $I_{DRV}$ is $I_{DRV} = -V_{REF}/k$. The variation $\Delta I = I_{MAX} - I_{MIN}$ of the drive current $I_{DRV}$ is $V_H/k$, which is constant regardless of a value of the reference voltage $V_{REF}$.

That is, according to the drive circuit 100a, a range of the drive current $I_{DRV}$ can be arbitrarily set according to a level of the reference voltage $V_{REF}$. For example, when the reference voltage $V_{REF}$ is the center value $V_H/2$ of the range of 0 to $V_H$ of the control voltage $V_{CNT}$, $I_{MAX}=-I_{MIN}$, and the maximum values of currents that flow in the positive and negative directions become equal to each other. When the reference voltage $V_{REF}$ is higher than the center value $V_H/2$, the amount of current that flows in the negative direction becomes larger and, conversely, when the reference voltage $V_{REF}$ is smaller than the center value $V_H/2$, the amount of current that flows in the positive direction becomes larger.

It should be noted that the current driver 106b of FIG. 8 may be used to drive the VCM 202 having the spring return mechanism.

(Third Modification)

In the drive circuit 100a of FIG. 8, the drive current $I_{DRV}$ is given by Eq. 11), and $-V_{REF}/k$ following the reference voltage $V_{REF}$ corresponds to an offset component of the drive current $I_{DRV}$. Therefore, the current driver 106b of FIG. 8 can be used as the current driver 106a of the second modification (FIG. 7). That is, the control circuit 104a of FIG. 7 may apply the control voltage $V_{CNT}$ corresponding to the current command value S3 and the reference voltage $V_{REF}$ corresponding to the offset command value S4 to the current driver 106b of FIG. 8.

(Fourth Modification)

In the drive circuit 100b of FIG. 8, the case where the first driver 40p and the second driver 40n linearly drive the VCM 202 has been described, but PWM driving may be performed. That is, the first driver 40p and the second driver 40n may generate pulsed drive voltages $V_{O+}$ and $V_{O-}$, respectively, and change duty ratios of the drive voltages $V_{O+}$ and $V_{O-}$ according to the error voltage $V_{ERR}$.

(Fifth Modification)

In the drive circuit 100b of FIG. 8, the case where the detection resistor $R_{NF}$ is interposed between the second driver 40n (the first driver 40p) and the coil L1 has been described, but the position of the detection resistor $R_{NF}$ is not limited thereto. The detection resistor $R_{NF}$ may be connected in series with the high-side transistor MH between an output terminal OUT+ (OUT−) and a power supply line or in series with the low-side transistor ML between the output terminal OUT+ (OUT−) and a ground line. Alternatively, as the detection resistor $R_{NF}$, on-resistance of the transistors MH and ML) constituting the output stage of the first driver 40p and/or on-resistance of the transistors MH and ML constituting the output stage of the second driver 40n may be used.

Alternatively, when a DC resistance component (parasitic resistance) of the VCM 202 is known, the resistance value of the VCM 202 may be used as the detection resistance $R_{NF}$. A voltage across the VCM 202 is the sum of a voltage drop generated in the resistance component and a counter electromotive force generated in the inductance (coil) L1. There, the current detection circuit 20 may remove the counter electromotive force generated in the coil L1 from the voltage across the VCM 202 and detect the voltage drop of the resistance component, Well-known techniques can be used for such a current detection circuit.

(Sixth Modification)

FIG. 9 is a circuit diagram of a drive circuit 100c according to a sixth modification. In this drive circuit 100c, an interface circuit 102c receives the second signal S2 directly from the sensor 206 via a signal line 210 without going through the host processor 204. The second signal S2 may be digital data or an analog signal. In the latter case, the interface circuit 102c includes an A/D converter which converts the analog signal S2 into a digital signal. This modification can achieve the same effect as the embodiment. Also in FIGS. 7 and 8, the second signal S2 may be input directly to the drive circuit 100a or 100b from the sensor 206.

(Others)

Although the focusing lens module has been described in the embodiment, the application of the drive circuit 100 is not limited thereto. For example, the VCM 202 may drive a lens for camera shake compensation. In addition, the drive circuit can be used for various applications in which the stroke amount is varied depending on the posture of the electronic apparatus.

(Seventh Modification)

The first signal S1 and the second signal S2 may be transmitted via different data buses or different signal lines. For example, the interface circuit 102 may receive the first signal S1 as an analog signal and receive the second signal S2 as digital data.

According to the present disclosure in some embodiments, it is possible to converge an object to be position-controlled to a target position in a short time irrespective of a posture of an electronic apparatus.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A drive circuit which is mounted on an electronic apparatus having a voice coil motor and drives the voice coil motor; comprising:
    an interface circuit configured to receive a first signal indicating a target position of the voice coil motor and a second signal related to a posture of the electronic apparatus;
    a control circuit configured to generate a current command value of a drive current in response to the first signal and the second signal; and
    a current driver configured to generate the drive current in response to the current command value and supply the drive current to the voice coil motor.

2. The drive circuit of claim 1, wherein the control circuit offsets a relationship between the first signal and the current command value in response to the second signal.

3. The drive circuit of claim 2, wherein an object to be position-controlled by the voice coil motor is connected to a return spring, and an offset amount of the relationship between the first signal and the current command value is defined by $Gx/(2\pi f_0)^2$, where $f_0$ denotes a resonance frequency of a system including the object and the return spring and Gx denotes a stroke direction component of gravity applied to the object.

4. The drive circuit of claim 3, wherein the object to be position-controlled by the voice coil motor is a focusing lens.

5. The drive circuit of claim 1, wherein the electronic apparatus includes an acceleration sensor and the second signal includes an output of the acceleration sensor.

6. The drive circuit of claim 1, wherein the interface circuit receives the first signal and the second signal via a common data bus.

7. The drive circuit of claim 6, wherein the data bus is an I²C (Inter Integrated Circuit) bus.

8. The drive circuit of claim 1, wherein the drive circuit is integrated on a single semiconductor substrate.

9. A lens module comprising:
a focusing lens or a lens for camera shake compensation;
a voice coil motor including a mover connected to the focusing lens or the lens for camera shake compensation; and
a circuit of claim 1, which is configured to drive the voice coil motor.

10. An electronic apparatus comprising:
a lens module of claim 9; and
an imaging element configured to take an image of light which passed through the lens module.

11. A method for driving a voice coil motor, comprising:
generating a first signal indicating a target position of the voice coil motor and a second signal related to a posture of an electronic apparatus on which the voice coil motor is mounted;
generating a current command value of a drive current in response to the first signal and the second signal; and
generating the drive current in response to the current command value and supplying the drive current to the voice coil motor.

12. The method of claim 11, wherein the act of generating a current command value includes offsetting a relationship between the first signal and the current command value in response to the second signal.

13. The method of claim 11, wherein the second signal is generated based on an output of an acceleration sensor.

* * * * *